Nov. 22, 1960   D. H. THORBURN   2,961,162
REVERSIBLE AUTOMATIC THERMOSTAT
Filed Oct. 11, 1956   2 Sheets-Sheet 1
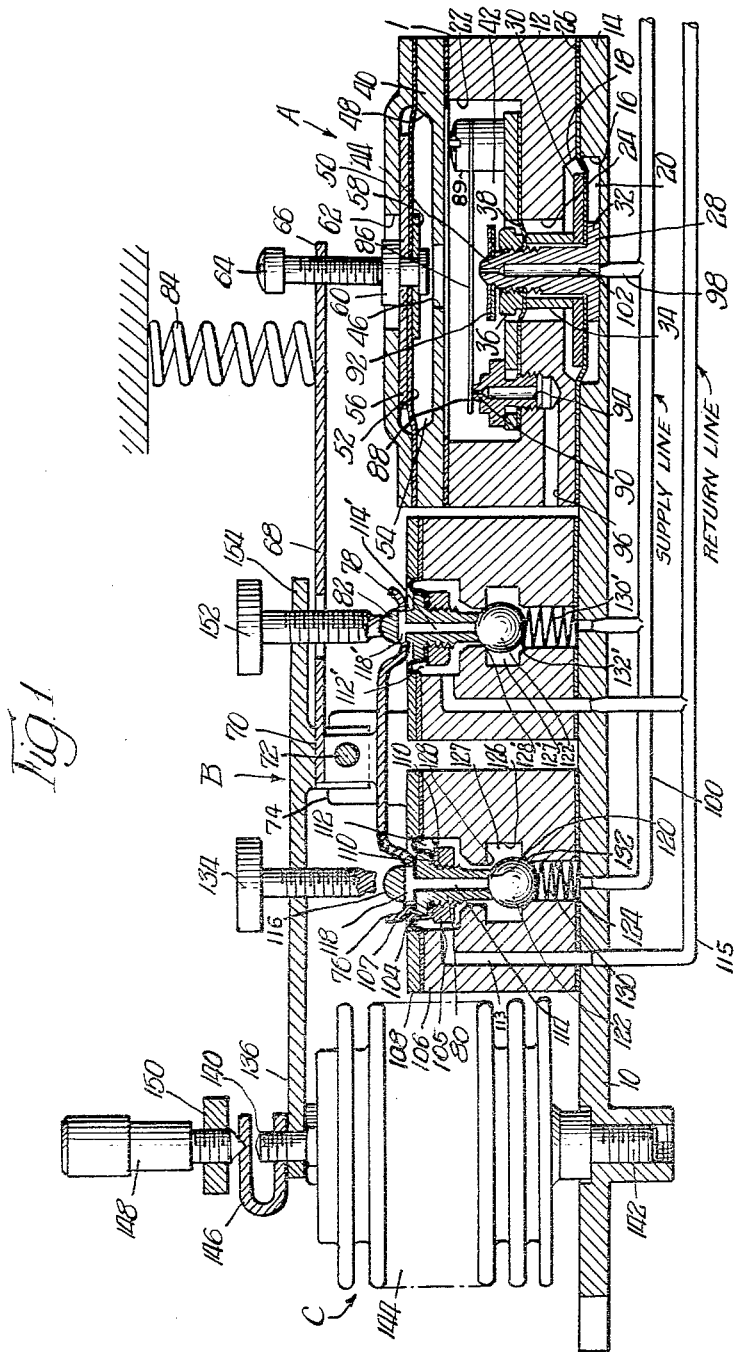
INVENTOR.
David H. Thorburn,
BY Wilkinson, Huxley,
Byron + Hume
ATTYS.

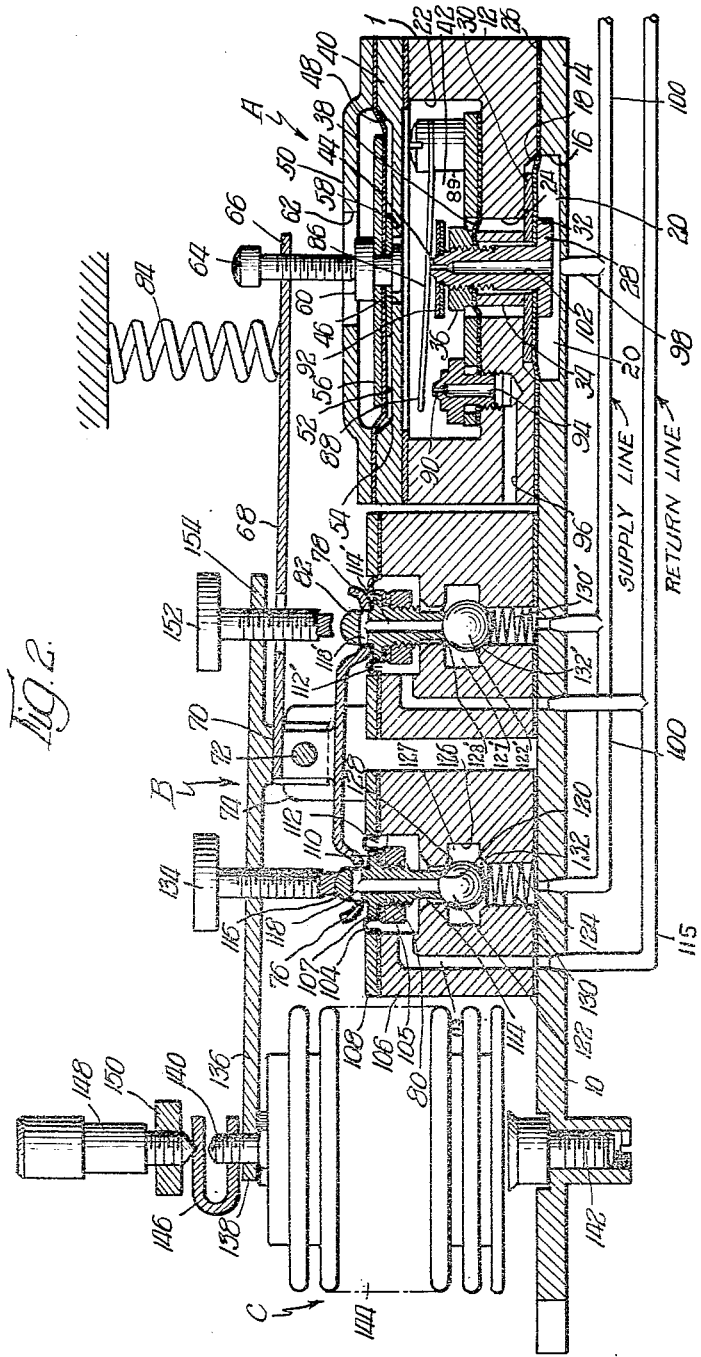

United States Patent Office 2,961,162
Patented Nov. 22, 1960

2,961,162
REVERSIBLE AUTOMATIC THERMOSTAT

David H. Thorburn, Oak Park, Ill., assignor to The Powers Regulator Company, Skokie, Ill., a corporation of Illinois Filed Oct. 11, 1956, Ser. No. 615,371

5 Claims. (Cl. 236—1)

This invention relates to a reversible automatic thermostat which is operable in a direct or reverse sense, depending upon the selective conditioning of the control means.

Modern air temperature control systems often provide both heating and cooling cycles for conditioning the air in a single enclosure. These systems necessitate thermostatic control arrangements which are adapted to respond to increases in temperature in the summer to activate the cooling cycle, i.e. reverse acting, and to decreases in temperature in the winter to activate the heating cycle, i.e. direct acting.

Originally, separate controls were used for each cycle, but due to considerations of size, efficiency and expense, the more recent concern has been with providing a single control device which is adapted to provide both direct and reverse acting responses to control both the heating and cooling cycle.

Reversible automatic thermostats heretofore have generally used a single valve for fluid control which must control the fluid during both the heating and cooling cycles. In reversible automatic thermostats using a single valve for fluid control, the problem of achieving direct acting or reverse acting responses is achieved by very complicated leverage systems having such disadvantages as excessive size, laggardly response and hysteresis effects, for example. The very complexity of this single valve reversible automatic thermostat has reduced the reliability, rendered them either difficult or impossible to repair, and substantially increased the cost of manufacture.

Thus, a principal object of this invention is to provide a reversible automatic thermostat comprising a plurality of valve assemblies which facilitate the use of much less complicated lever systems for controlling the direction of response and for responding to temperature changes.

The few reversible automatic control devices in the prior art which have incorporated a plurality of valves for pressure control, such as that shown in the Karl A. Otto Patent No. 2,064,175, for example, have utilized selector mechanisms which act upon the thermostatic actuation means to control the direction of response. Such constructions necessitate lever arrangements as complex, or in some instances more complex than those previously used with the single valve reversible automatic thermostat. Thus, the disadvantages heretofore mentioned in relation to the single valved automatic reversible thermostats have not been overcome by the prior art.

Therefore, an additional object of this invention is to provide a reversible automatic thermostat in which the selector mechanism acts directly on the valve assemblies to control the direction of response of the automatic reversible thermostat.

In order to achieve such a reversible automatic thermostat, this invention is further concerned with providing valving arrangements which are adapted to be acted upon by a condition responsive means so as to be selectively removed from or placed in operative relationship with the temperature responsive actuating means.

Further objects and advantages of this invention will become evident as the description proceeds and from an examination of the accompanying drawings in which similar numerals refer to similar parts throughout the several views.

In the drawings:

Figure 1 is a view in side elevation and partly in vertical cross section of one form of reversible automatic thermostat incorporating the invention, the thermostat being shown conditioned to respond in the direct sense.

Figure 2 is a view in side elevation and partly in vertical cross section of the thermostat shown in Figure 1 with the device conditioned to respond in the reverse sense.

The device as shown in Figures 1 and 2 comprises three main component parts, namely, the pressure responsive valve conditioning means, or relay, indicated generally by the letter A, a valving assembly for controlling the branch line pressure indicated generally by the letter B, and a thermally responsive bellows assembly indicated generally by the letter C. Any suitable valve conditioning means or relay may be used although that shown in the co-pending application of J. E. Panza, Serial No. 629,682, filed December 20, 1956, now Patent No. 2,886,006, is preferred. All three of these elements may be mounted on a suitable supporting base 10. The valve conditioning means A is formed of a housing block 12 which is adapted to be secured to the end 14 of the base 10 in cooperative association with a cylindrical recess 16 formed in the base member 10. A complementary recess 18 in the housing block 12 is aligned with this recess 16 to form a lower chamber 20. This lower chamber 20 communicates through the centrally disposed bore 24 with an upper chamber 22 formed in the upper surface of the housing block 12. A flexible diaphragm 26 is disposed in sealing relation between the end 14 of the base 10 and the lower surface of the housing block 12 and extends across the lower chamber 20.

A nozzle 28 is centrally supported in the diaphragm 26 in upstanding relation thereto within the bore 24. An annular stiffening plate 30 is provided which is secured against the diaphragm 26 and the shoulder 32 at the base of the nozzle 28 by the sleeve 34 which surrounds the main body of the nozzle 28. A ring member 36 is threadedly secured to the upper end of the nozzle 28 and serves to clamp the sleeve member 34 against the annular plate 30. The ring member 36 also clamps the center of a second flexible diaphragm 38 against the upper edge of the sleeve 34 so that the entire nozzle assembly is supported by the two diaphragms 26 and 38 in longitudinally movable relation in the bore 24.

A cover plate 40 is secured to the upper surface of the housing block 12 and together with the recess 22 in the latter forms an upper chamber 42 into which the upper end 44 of the nozzle 28 extends. The cover plate 40 has a central bore 46 formed therein which communicates with a recess 48 formed on the upper side of the cover plate. A second cover plate 50 extends across the recess 48 forming an additional chamber 54. The diaphragm 52 extends across the chamber 54 and is provided with stiffening plates 56 and 58 which are clamped on opposite sides thereof by the clamping and abutment member 60. A central opening 62 is provided in the cover plate 50 so that the lower end of the threaded abutment member 64 can extend into abutting relation with the member 60. The abutment member 64 is threadedly received in the end 66 of the control arm 68 which has its opposite end 70 pivotally mounted on the rock shaft 72 supported by the ears 74 secured to the base plate 10. A pair of control arms 76 and 78 extend outwardly on opposite sides from the rock shaft 72 as continuations of the control arm 68 and function in a manner which will be subsequently described to actuate a pair of control valves 80 and 82, respectively, in the valve assembly B. A spring member 84 is provided which normally urges the control arm 68 in a direction such that the end 66 of the control arm will be disposed in its lowermost position so that the reinforcing plate 58 on the flexible diaphragm 52 is in abutment with the upper surface of the cover plate 40.

A flapper valve 86 is mounted at one end within the chamber 42 on the post 89 so that its intermediate portion is in alignment with the upper end 44 of the nozzle 28 and its outer end is normally disposed in abutment with the fixed nozzle 90 which is secured within the chamber 42 to the housing block 12. A leaf spring member 92 is also disposed within the chamber 42 and is of such a configuration that it normally urges the nozzle 28 downwardly, as viewed in Figure 1, so that the end 44 thereof is held out of association with the intermediate portion of the flapper valve 86.

A longitudinal bore 94 is provided in the nozzle 90 and communicates with a bore 96 in the housing block 12 which opens to the atmosphere. A conduit 98 connects the lower chamber 20 to the main pressure supply line 100 which normally contains air under a relatively high or low pressure depending upon whether the system is set for heating or cooling.

A pressure responsive valve conditioning means A is thus provided which is capable of adjusting the position of the control arm 68 in accordance with the value of the air pressure within the main supply line 100. As just stated, when the pressure within this line is at its relatively low value (12 p.s.i., for example) valve conditioning means A is in the position of adjustment shown in Figure 1. Under such circumstances the air pressure within the lower chamber 20 is not sufficiently high to cause the pressure exerted upwardly on the flexible diaphragm 26 to be great enough to overcome the downward pressure normally exerted on the nozzle 28 by the leaf spring 92. Under such circumstances the valve 28 is in the lowermost position as shown in Figure 1 and its upper end 44 is disposed out of association with the intermediate portion of the flapper valve 86. This permits the outer end 88 of the latter to abut the nozzle 90 so that the latter is closed and the nozzle 28 is open. Such a position of adjustment will cause the full pressure of the main supply line to be applied to the chamber 42 and this same pressure will be applied through the opening 46 to the chamber 54. With such pressure applied to the underside of the diaphragm 52 in the chamber 54, this member will be moved upwardly to the position shown in Figure 1 with the stiffening plate 56 in abutment with the lower surface of the cover plate 50. Such movement of the diaphragm 52 will cause the abutment member 60 to move the abutment member 64 upwardly so that the end 66 of the control arm 68 is moved to the uppermost position as shown in Figure 1.

If the pressure in the main supply line 100 is increased to the relatively high value (17 p.s.i. for example) the pressure within the chamber 20 is then sufficient to cause the diaphragm 26 to move upwardly until the stiffening plate 30 is moved into abutment with the upper surface of the recess 18 in the housing block 12. The diaphragm 38 will also flex upwardly under such circumstances and the end 44 of the nozzle 28 will be moved into abutment with the intermediate portion of the flapper valve 86 thus closing the central bore 102 therein. At the same time as the end of the flapper valve 86 is moved upwardly, the bore 94 in the nozzle 90 will be opened to the chamber 42 so that the latter is opened to the atmosphere and the pressure therein is reduced to atmospheric pressure. Such a reduction in the pressure within the chamber 42 will cause the diaphragm 52 to be moved downwardly under the pressure of the spring 84 and the end 66 of the control arm 68 will be moved to the lowermost position as shown in Figure 2.

As previously stated the pressure responsive valve conditioning means A just described is adapted to control the activation of the two valves 80 and 82 previously mentioned. Each of these valve assemblies is substantially identical so that only one such assembly, the valve member 80, will be described in detail. The other valve member 82 is made up of like components, as shown in the drawings, having assigned thereto reference characters identical to those assigned to the valve member 80 but appended with a prime character to indicate their specific association with the valve member 82. The valve member 80 is centrally mounted in a flexible diaphragm 104, the retaining ring 105 being adapted to clamp the periphery of a central opening in the diaphragm against the lower edge of the shoulder 107 on the valve. The diaphragm 104 is secured to the upper surface of the valve block 106 by a retaining plate 108. The block 106 is provided with a recess 110 in its upper surface which together with the diaphragm 104 forms a chamber 112 through which the valve 80 extends. The block 106 is also provided with a bore 113 which connects the chamber 112 to the return line 115 through a suitable opening in the base plate 10. A centrally disposed longitudinal bore 114 is formed in the valve 80, the upper end 116 of the valve having a transverse bore 118 formed therein which intersects the longitudinal bore 114 and provides communication to the atmosphere. The opposite end 120 of the valve 80 has a valve seat surface formed thereon which surface is adapted to abut the ball valve 122 under certain conditions. A central bore 124 is also provided in the block 106 communicating with the recess 110 and, therefore, the chamber 112. The main supply line 100 communicates with the bore 124 through a suitable opening in the base plate 10. The ball 122 is disposed within an area of enlarged diameter 126 forming a chamber 127 intermediate the ends of the bore 124 and is normally urged upwardly into association with a valve seat 128 formed on the upper surface of the chamber 127 by the spring member 130 disposed in the bore 124, with its lower end in abutment with the upper surface of the base plate 10 to which the block 106 is secured.

As shown in Figure 2 the valve member 80 is normally positioned so that the valve seat 120 on the lower end thereof is in abutment with the ball valve 122 thus closing the bore 114. At the same time the ball valve 122 closes the bore 124 at the valve seat 128. With the control arm 76 in the uppermost position out of association with the upper side of the shoulder 107, the valve 80 is free to move along its longitudinal axis a limited distance since the diaphragm 104 is flexible. With the valve 80 shown in the position shown in Figure 2, upward movement of the valve will cause the bore 114 to be opened to the chamber 112 as the valve seat 120 is moved away from association with the ball valve 122. Likewise, downward movement from the position shown in Figure 2 of the valve 80 will cause the ball valve 122 to be moved away from the seat 128 opening the bore 124 to the chamber 112. Further movement in a downward direction of the valve 80 will cause the ball valve 122 to be moved into seated association with the valve seat 132 on the lower surface of the chamber 127. When the ball valve is so seated, the bore 124 is again sealed and out of communication with the chamber 112. Likewise, when the valve 80 is moved downwardly against the ball 122, the bore 114 is sealed against communication with the atmosphere through the transverse bore 118.

Movement is imparted to the valve 80 through the threaded, adjustable abutment member 134 which is carried by the lever arm 136, also pivoted intermediate its ends on the rock shaft 72. One end 138 of the lever arm 136 is secured to the upper end 140 of the thermally responsive bellows member indicated generally by the letter C. This end 140 has a U-shaped, flexible spring member 146, also fixed thereto, one side of which is adapted to abut the adjustable abutment member 148 threadedly received in the support 150 mounted on the base plate 10.

A second threaded, adjustable abutment member 152 is carried by the opposite end 154 of the control arm 136 on the opposite side of the rock shaft 72. This abutment member 152 is adapted to be moved into cooperative association with the valve member 82 which, as previously stated, has a construction identical with the valve 80 and is also associated with identical additional elements.

Considering now the operation of the device in accordance with the invention, it is understood that the reversible automatic thermostat is for use with air-conditioning apparatus adapted to both heat and cool the atmosphere. Accordingly, in use, the arrangement is adjusted for summer cooling and winter heating.

Giving attention first to the adjustment for summer cooling, the pressure within the main supply line 100 is made to be low at approximately twelve pounds per square inch. In this circumstance, the valve conditioning means A is in the position of adjustment shown in Figure 1. Specifically, the abutment 64 is in its extended position so that the control arm 68 is in its uppermost position against the spring 84. The control arm 76 connected to the arm 68 positions the valve member 80 so that the valve seat 120 on the lower end thereof is in abutment with the ball valve 22 so as to close the bore 114. Further, the valve member 80 is operated in a downward position sufficient to force the ball valve 122 into seated association with the valve seat 132 on the lower surface of the chamber 127. In this circumstance, the bore 124 communicating with the main supply line is sealed so as to isolate the chamber 112. In the bore 114, the valve member is sealed against communication with the atmosphere. Accordingly, this valve member serves no control function during the summer cooling period.

However, at the same time the control arm 78 is connected to the arm 68 in an upward position so that the valve member 82 is urged upwardly by the spring 130' operating through the ball valve 122'. Accordingly, the ball valve 122' is seated in the valve seat 128' thereby closing the main line supply from communication with the upper chamber 112'. In this position, the valve member 82 is free to move upwardly in the chamber 112' out of contact with the ball valve 122' so that the chamber 112' is in communication with the outside atmosphere via the bore 114' and the transverse bore 118' of the valve member 82. In this condition, the return line, which is connected directly to the chamber 112', is at atmospheric pressure.

Changes in temperature are registered in the bellows member C. That is, responsive to an increase in temperature, for example, the upper end 140 of the bellows is moved upwardly thereby moving the lever arm 136 so as to engage the abutment member 152 into cooperative association with the valve member 82. In this circumstance, the valve member 82 is urged into abutment with the ball valve 122' so as to close the bore 114' and interrupt the communication between the atmosphere and the return line as described before. If the valve member 82 is urged further downwardly by the abutment member 152, the ball valve is unseated from the valve seat 128' so as to permit communication between the main supply line 100, the chamber 127', the chamber 112' and the return line. Accordingly, the pressure in the return line is increased, thereby permitting the return line to perform a control function at its terminus end. It is obvious from the foregoing that for summer cooling, the pressure in the return line varies directly with variations in temperature. That is, as the temperature increases, the pressure in the return line also increases.

Now giving attention to the winter heating operation for this circumstance, the air pressure on the main supply line 100 is increased, for example, to seventeen pounds per square inch. Accordingly, the abutment member 64 is moved downwardly as shown in Figure 2 so that the end 66 of the control arm 68 is in its downward position and the conditions of the two valve members 80 and 82 are exactly reversed from that described above with regards to summer operation. That is, the valve member 82 is completely de-activated and the valve member 80 is placed in condition for operation. In this circumstance, the valve member 80 is operated by the abutment member 134 carried on the lever arm 136 which is in turn operative from the bellows member C. Thus as the temperature increases, the bellows member expands so as to cause the end 138 of the lever arm 136 to move upwardly and the abutment member 134 with it. This permits the valve member 80 upward motion, the ball valve to rise and the ball valve 122 to seat against the valve seat 128 and at the same time, the valve member may be removed from the ball valve 122 so as to complete the communication path between the outside atmosphere and the return line via the transverse bore 118, the axial bore 114 and the chamber 112. As the temperature decreases, the bellows member is retracted thereby moving the lever arm 136 downward so as to cause the abutment member 134 to engage the valve 80 and move the valve member into cooperative association with the ball valve 122 thereby sealing the bore 114.

A continuation of the downward motion causes the ball valve 122 to be unseated from the seat 128 and to complete a communication path from the main line supply 100 through the chamber 127 and the chamber 112 to the return line. Depending upon the amount of temperature decrease, the pressure in the return line increases from atmospheric pressure towards seventeen pounds per square inch. It is obvious that in this circumstance, the pressure on the return line varies inversely with changes in room temperature. That is, as the temperature in the room decreases, the pressure in the return line increases.

From the foregoing explanation, it is clear that the return line controls the pressure responsive heating and cooling equipment. Inasmuch as the pressure responsive equipment forms no part of the present invention, it is not discussed further herein. As to the temperature responsive control, it is to be understood that the described operation is merely by way of example and that variations may be made therein without changing the principles of the invention.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A control system comprising a first valve assembly, a second valve assembly, a first conduit supplying fluid under pressure to said first and second valve assemblies, a second conduit carrying fluid under pressure from said first and second valve assemblies, each of said valve assemblies being normally operative in a control position and being selectively operative into a shut-off position, temperature responsive means for operating said first valve assembly when in said control position between said control and shut-off positions to complete a connection between said first conduit and said second conduit and to supply fluid into said second conduit supply at pressures varying directly with variations in temperature and for operating said second assembly valve when in said control position between said control and shut-off positions to complete a connection between said first conduit and said second conduit and to supply fluid into said second conduit at pressures varying inversely with variations in temperature, and selection means operative alternately into a first condition and into a second condition, said selection means in said first condition operating said first valve assembly into said control position and said second valve assembly into said shut off position, said selection means in said second condition operating said first valve assembly into said shut off position and said second valve assembly into said control position, whereby only one of said first and second valve assemblies is in operative relationship with said temperature responsive means at any given time.

2. A control system comprising a first valve assembly, a second valve assembly, a first conduit supplying fluid under pressure to said first and second valve assemblies, a second conduit carrying fluid under pressure from said first and second valve assemblies, each of said valve assemblies comprising; a fluid chamber, a first channel connecting said first conduit to said fluid chamber, a second channel connecting said fluid chamber to said second conduit, a valve in said chamber normally seated in a first position at the opening to said second channel blocking communication between said chamber and said second conduit, and control means for moving said valve between said first position and a second position at the opening to said first channel, said valve in said second position blocking communication between said first conduit and said fluid chamber; temperature responsive means engagable to the control means of said first valve assembly for moving the valve thereof between said first and second positions to permit communication between said first conduit and said second conduit via the fluid chamber thereof and to supply fluid into said second conduit at pressures varying directly with variations in temperature, said temperature responsive means being engagable additionally to the control means of said second valve assembly for moving the valve thereof between said first and second positions to permit communication between said first conduit and said second conduit via the fluid chamber thereof and to supply fluid into said second conduit at pressures varying inversely with variations in temperature, and selection means operative alternately into a first condition and into a second condition, said selection means in said first condition engaging the control means of said first valve assembly into operative relationship with said temperature responsive means and forcibly moving said control means of said second valve assembly to seat the valve thereof in said second position, said selection means in said second condition engaging the control means of said second valve assembly into operative relationship with said temperature responsive means and forcibly moving the control means of said second valve assembly to seat the valve thereof in said second position.

3. The control system set forth in claim 2 wherein the valve in each of said first and second valve assemblies is a ball valve.

4. A control system comprising a first valve assembly, a second valve assembly, a first conduit supplying fluid under pressure to said first and second valve assemblies, a second conduit carrying fluid under pressure from said first and second valve assemblies, each of said valve assemblies comprising; a fluid chamber, a first channel connecting said first conduit to said fluid chamber, a second channel connecting said fluid chamber to said second conduit, a spring biased ball valve in said chamber normally seated in a first position at the opening to said second channel blocking communication between said chamber and said second conduit, and a movable stem engaging said ball valve and selectively controllable for forcibly moving said ball valve against said bias between said first position and a second position at the opening to said first channel, said valve in said second position blocking communication between said first conduit and said fluid chamber; temperature responsive means engageable to the stem of said first valve assembly for moving the ball valve thereof between said first and second positions to permit communication between said first conduit and said second conduit via the fluid chamber thereof and to supply fluid into said second conduit at pressures varying directly with variations in temperature, said temperature responsive means being engageable additionally to the stem of said second valve assembly for moving the ball valve thereof between said first and second positions to permit communication between said first conduit and said second conduit via the fluid chamber thereof and to supply fluid into said second conduit at pressures varying inversely with variations in temperature, and selection means operative alternately into a first condition and into a second condition, said selection means in said first condition engaging the stem of said first valve assembly into operative relationship with said temperature responsive means and forcibly moving the stem of said second assembly valve to seat the ball valve thereof in said second position, said selection means in said second condition engaging the stem of said second valve assembly into operative relationship with said temperature responsive means and forcibly moving the stem of said first assembly valve to seat the ball valve thereof in said second position.

5. The control system set forth in claim 4 wherein said temperature responsive device is an expandable sealed chamber of a bellows type construction.

References Cited in the file of this patent

UNITED STATES PATENTS

| | | |
|---|---|---|
| 1,500,260 | Otto et al. | July 8, 1924 |
| 2,021,263 | Otto | Nov. 19, 1935 |
| 2,064,175 | Otto | Dec. 15, 1936 |
| 2,120,507 | Otto | June 14, 1938 |
| 2,310,293 | Joesting | Feb. 9, 1943 |
| 2,349,209 | Taylor | May 16, 1944 |
| 2,495,226 | Crago | Jan. 24, 1950 |
| 2,601,377 | Ellis | June 24, 1952 |
| 2,724,555 | Roetter | Nov. 22, 1955 |
| 2,774,377 | MacDuff | Dec. 18, 1956 |
| 2,805,025 | Dillman | Sept. 3, 1957 |